US010598763B2

(12) United States Patent
Kellum et al.

(10) Patent No.: US 10,598,763 B2
(45) Date of Patent: Mar. 24, 2020

(54) SYSTEM AND METHOD FOR CONCURRENT COMMUNICATION OF DIFFERENT SIGNAL TYPES BY A RADAR

(71) Applicant: RAYTHEON COMPANY, Waltham, MA (US)

(72) Inventors: Theodore M. Kellum, Canyon Country, CA (US); Walter B. Schulte, Jr., Huntington Beach, CA (US); Harry B. Marr, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 539 days.

(21) Appl. No.: 15/221,347

(22) Filed: Jul. 27, 2016

(65) Prior Publication Data
US 2018/0095161 A1 Apr. 5, 2018

(51) Int. Cl.
*G01S 7/02* (2006.01)
*G01S 13/86* (2006.01)
(Continued)

(52) U.S. Cl.
CPC .............. *G01S 7/023* (2013.01); *G01S 7/021* (2013.01); *G01S 7/282* (2013.01); *G01S 13/10* (2013.01);
(Continued)

(58) Field of Classification Search
CPC .......... G01S 13/86; G01S 13/10; G01S 13/00; G01S 13/02; G01S 7/023; G01S 7/021;
(Continued)

(56) References Cited

U.S. PATENT DOCUMENTS

| 4,347,515 A | * | 8/1982 | Hoover, Jr. | ........ G01K 11/006 342/198 |
| 4,733,238 A | * | 3/1988 | Fiden | .............. G01S 7/006 342/60 |

(Continued)

FOREIGN PATENT DOCUMENTS

WO WO 2016/065167 A1 4/2016

OTHER PUBLICATIONS

Sit, Yoke Leen et al.; "The OFDM Joint Radar-Communication System: An Overview"; SPACOMM 2011: The Third International Conference on Advances in Satellite and Space Communications; 2011; pp. 69-74.
(Continued)

*Primary Examiner* — Timothy A Brainard
(74) *Attorney, Agent, or Firm* — Lewis Roca Rothgerber Christie LLP

(57) ABSTRACT

A method for concurrent transmission of different signal types by a radar system includes: receiving a waveform request for transmitting a first signal type and a second signal type; determining whether the first signal or the second signal is optimized; when the first signal is optimized: transmitting the first and the second signal simultaneously in separate bands; and when the second signal is optimized: determining a time gap between transmission of the second signal, and adjusting pulse repetition interval (PRI) or pulse width of the first signal to fit in the time gap, transmitting the second signal, and transmitting the first signal in the time gap between the transmission of the second signal.

18 Claims, 5 Drawing Sheets

(51) Int. Cl.
*G01S 13/10* (2006.01)
*G01S 7/282* (2006.01)
*H01Q 3/26* (2006.01)
*H04B 7/08* (2006.01)
*H04W 16/14* (2009.01)

(52) U.S. Cl.
CPC ............. *G01S 13/86* (2013.01); *H01Q 3/267* (2013.01); *H04B 7/086* (2013.01); *H04W 16/14* (2013.01); *H01Q 3/2658* (2013.01)

(58) Field of Classification Search
CPC . G01S 7/006; G01S 7/28; G01S 7/282; H04B 7/02; H04B 7/024; H04B 7/028; H04B 7/0452; H04B 7/06; H04B 7/0602; H04B 7/0604; H04B 7/0608; H04B 7/0613; H04B 7/0617; H04B 7/0619; H04B 7/0632; H04B 7/0686; H04B 7/12; H04W 16/00; H04W 16/02; H04W 16/14; H01Q 3/2658
See application file for complete search history.

(56) References Cited

U.S. PATENT DOCUMENTS

| | | | |
|---|---|---|---|
| 4,866,447 A | 9/1989 | Loucks | |
| 7,486,221 B2 | 2/2009 | Meyers et al. | |
| 8,249,031 B1* | 8/2012 | Hirsch | H04W 72/1215 370/336 |
| 2004/0047324 A1 | 3/2004 | Diener | |
| 2005/0059363 A1 | 3/2005 | Hansen | |
| 2006/0082489 A1 | 4/2006 | Liu et al. | |
| 2011/0097998 A1* | 4/2011 | Ko | H04W 72/1215 455/41.2 |
| 2012/0032833 A1* | 2/2012 | Milligan | G01S 7/006 342/59 |
| 2012/0069766 A1* | 3/2012 | Fu | H04B 1/406 370/252 |
| 2016/0037544 A1 | 2/2016 | Wang | |
| 2016/0174233 A1 | 6/2016 | Emmanuel et al. | |
| 2018/0026583 A1* | 1/2018 | Yanduru | H03F 1/0288 330/289 |

OTHER PUBLICATIONS

Almeida, et al. "Enabling LTE/WiFi coexistence by LTE blank Ssubframe allocation", IEEE ICC 2013—Wireless Communications Symposium, Jun. 9, 2013 (pp. 5083-5088).
International Search Report for corresponding International Application No. PCT/US2017/034688, filed May 26, 2017, International Search Report dated Aug. 9, 2017 and dated Aug. 23, 2017 (5 pgs.).
Written Opinion of the International Searching Authority for corresponding International Application No. PCT/US2017/034688, filed May 26, 2017, Written Opinion of the International Searching Authority dated Aug. 23, 2017 (7 pgs.).
Pinheiro et al., "Reconstruction of Coherent Pairs of Synthetic Aperture Radar Data Acquired in Interrupted Mode," IEEE Transactions on Geoscience and Remote Sensing, Sep. 2014, vol. 53, Issue: 4, pp. 1876-1893.

* cited by examiner

SYSTEM AND METHOD FOR CONCURRENT COMMUNICATION OF DIFFERENT SIGNAL TYPES BY A RADAR

FIELD OF THE INVENTION

The present invention relates generally to radar systems and more specifically to concurrent communication of different signal types by a radar.

BACKGROUND

An antenna array is a group of multiple active antennas coupled to a common source or load to produce a directive radiation pattern. Usually, the spatial relationship of the individual antennas also contributes to the directivity of the antenna array. A phased array antenna is an array of antennas in which the relative phases of the signals feeding the antennas are varied in a manner that the effective radiation pattern of the entire array is reinforced in a desired direction and suppressed in undesired directions.

FIG. 1 shows a diagram of a conventional antenna array 100. The antenna array 100 includes several linear arrays 104 housed in a (non-metallic) radome 102. Here, each linear array 104 is arranged vertically with spacing between each other, which is determined by the desired resonant frequency of the antenna array 100. Each linear array 102 is connected to its associated radio frequency (RF) electronics circuitry contained in an external RF electronics module 108, via an antenna feed 106. The RF electronics module 108 is connected to external systems via a connection 110 for power, control, and communications connections; and may be physically mounted on the radome 102, or may be located remotely or outside of the antenna array 100.

An Electronically Scanned Array (ESA) is a type of phased array antenna, in which transceivers include a large number of solid-state transmit/receive modules. In ESAs, an electromagnetic beam is emitted by broadcasting radio frequency energy that interferes constructively at certain angles in front of the antenna. An active electronically scanned array (AESA) is a type of phased array radar whose transmitter and receiver (transceiver) functions are composed of numerous small solid-state transmit/receive modules (TRMs). AESA radars aim their beam by emitting separate radio waves from each module that interfere constructively at certain angles in front of the antenna.

Digital beamforming is a signal processing technique used in sensor or radar arrays for directional signal transmission or reception. Digital beamforming is attained by combining elements in a phased array in such a way that signals at particular angles experience constructive interference, while other signals experience destructive interference. Digital beamforming can be used at both the transmitting and receiving ends in order to achieve spatial selectivity. An advantage of digital beamforming is transmitting multiple simultaneous summed signals through each radar element.

Modern radar, radar jammer and communications antenna systems often require wideband frequency capability within constrained volume allocations. Electronically Scanned Array (ESA) antenna and Active Electronically Scanned Array (AESA) antenna designs provide dense-packed, high-reliability electronics.

There are growing interests to use digital beamforming to transmit two or more different types of signals simultaneously such as communications (comms) signals, commercially available Long-Term Evolution (LTE) protocol signals, radar signals, and/or electronic warfare (EW) signals. This requires spectrum sharing by the different types of signals, for example, a radio frequency (RF) signal for military or radar applications, and a lower frequency (communication) signal for command and control applications, need to be simultaneously transmitted off a radar array.

For example, military radars and unmanned aircraft systems (UAS) that provide EW function may require concurrent use of C2 data links, the quality of service of which is not adversely effected by the RF fratricidal affects from EW and/or radar signals.

However, many conventional methods require separate, custom systems for each type of application/mission. Moreover, in the conventional systems, high peak-to-average power ratio (PAPR) for OFDM waveforms becomes a problem for the amplification stages for radar system.

Also, interleaving OFDM subcarriers dedicated for radar systems among communication subcarriers modulated with message symbols increase Integrated Side Lobes ratios and thus reducing SAR contrast image quality. Additionally, proposed optimal schemes are computationally expensive and have poor to moderate data rates.

As a result, there is a need for a method and system to allocate spectrum for a variety of commercial communication protocols, such as LTE protocol, in a radar-prioritized modes, and to perform radar modes within commercial communication protocols accurately and effectively.

SUMMARY

In some embodiments, the disclosed invention is a method for concurrent transmission of different signal types by a radar system. The method includes: receiving a waveform request for transmitting a first signal with a first frequency and a first power level and a second signal with a second frequency and a second power level, wherein the first frequency is higher than the second frequency and the first power level is higher than the second power level; determining whether the first signal or the second signal is optimized; when the first signal is optimized: transmitting the first and the second signal simultaneously in separate bands; and when the second signal is optimized: determining a time gap between transmission of the second signal, and adjusting pulse repetition interval (PRI) or pulse width of the first signal to fit in the time gap, transmitting the second signal, and transmitting the first signal in the time gap between the transmission of the second signal.

In some embodiments, the disclosed invention is a radar system for concurrent transmission of different signal types including: a waveform manager for receiving a waveform request for transmitting a first signal with a first frequency and a first power level and a second signal with a second frequency and a second power level, wherein the first frequency is higher than the second frequency and the first power level is higher than the second power level; a radar manager for determining whether the first signal or the second signal is optimized; and a transmitter for transmitting the first and the second signal simultaneously in separate bands, when the first signal is optimized, wherein when the second signal is optimized, a scheduler determines a time gap between transmission of the second signal, and the waveform manager adjusts pulse repetition interval (PRI) or pulse width of the first signal to fit in the time gap, and the transmitter transmits the second signal and transmits the first signal in the time gap between the transmission of the second signal.

The first signal may be a radar signal or a RF signal, and the second signal may be a comms signal, a Long-Term Evolution (LTE) protocol signal or an electronic warfare (EW) signal.

In some embodiments, the determination of whether the first signal or the second signal is optimized, is in response to receiving a user input, or is automatically performed by the radar system based on the received waveform request.

BRIEF DESCRIPTION OF THE DRAWINGS

These and other features, aspects, and advantages of the present invention will become better understood with regard to the following description, appended claims, and accompanying drawings.

DETAILED DESCRIPTION

Figure 1:
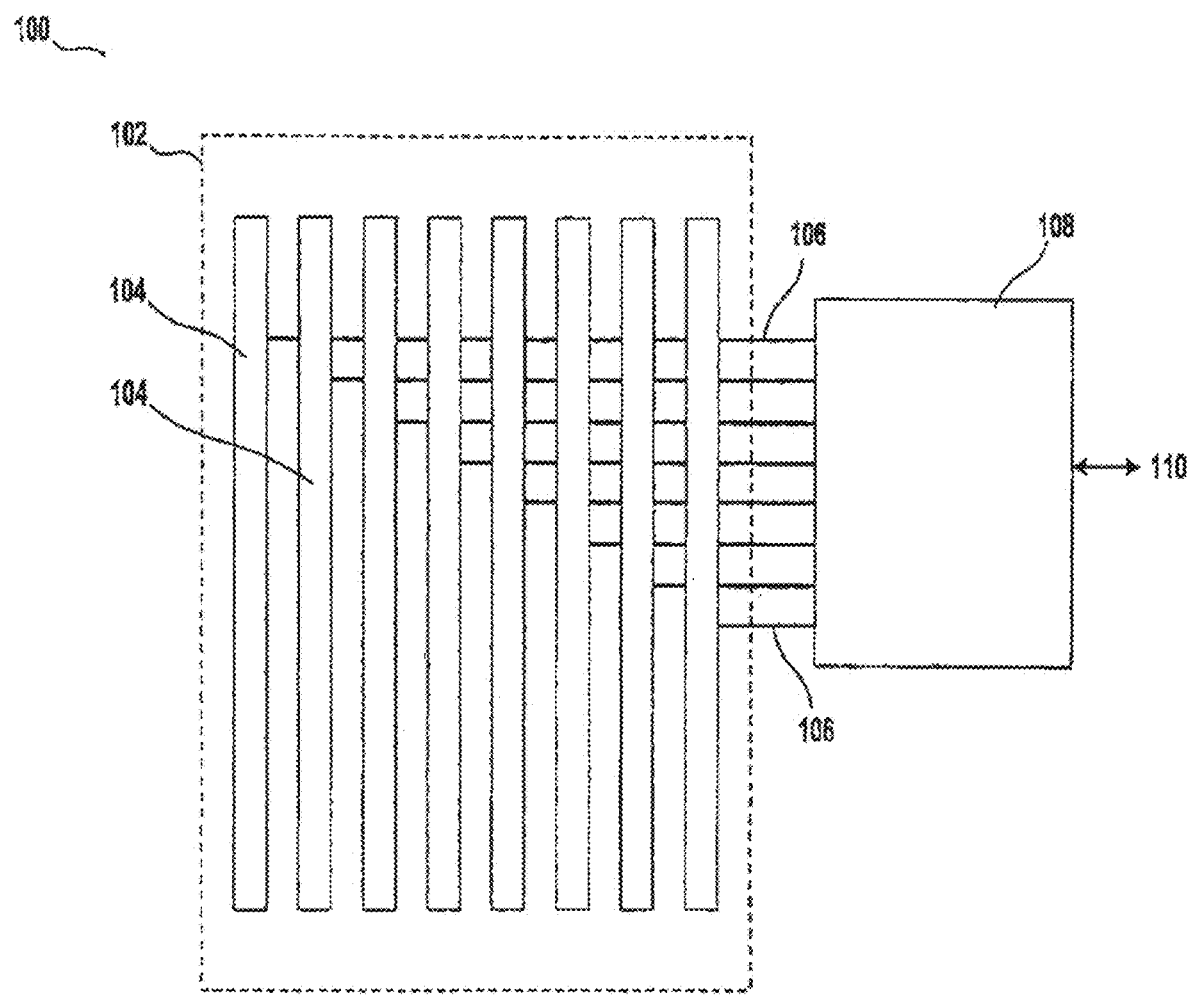
FIG. 1 shows a diagram of a conventional antenna array.

In some embodiments, the disclosed invention is a system and method for concurrent communication of different signal types by a radar. The disclosed invention independently optimizes radar/EA waveforms and LTE waveforms and schedule them for joint/simultaneous transmission. The disclosed invention enables a transmitter, for example, in a radar system, to simultaneously transmit two or more combined signals of different types out of the same antenna element and aperture, to allocate spectrum for a variety of commercial communication protocols, such as LTE protocol, in radar-prioritized modes, and to perform radar modes within commercial communication protocols.

In some embodiments, the disclosed invention partitions the operational instantaneous passband for the aperture/node in a non-static way according to the functional areas which operate concurrently, for example, EW, radar, comms, and/or identification, friend or foe (IFF). For example, in many cases, a radar would need a much wider bandwidth than a communications signal. Similarly, electronic warfare (EW) signals would need a still wider bandwidth. Often, the operational frequencies of these different modes (radar, EW, and communications) will be orthogonal and thus the system passband needs to be updated in real time according to the needs of these waveforms. In the case where the passbands of these individual modes are not orthogonal, there may be some synergy between the waveforms, such as a polymorphic phase coded waveform that can be used for both communications (comms) and radar. In this case, the disclosed invention determines the system passband as a union of the individual mode passbands. In the case where the individual mode waveforms are neither orthogonal, nor synergistic, time interleaving is typically performed where the system passband is often equal to the passband of the individual modes.

In some embodiments, the operational bandwidths of the respective functional area waveforms are separated by guard bands and in accordance with a programmable configuration item. However, in the case where the waveform operational frequencies are orthogonal, a guard band is often allocated in between the individual passbands in order to mitigate self-interference, as shown, for example, on the left side of FIG. 2. In some embodiments, the signals from each functional area are then passed through a waveform manager, summed, for example, as depicted by item 318 of FIG. 3, and fed into an asymmetric power amplifier, for example as shown by item 210 of FIG. 2, before being delivered to the radar radiating elements (or row/column of elements). The asymmetric power amplifier is useful because often the communications signals with high PAPR in the system have different needs than a powerful radar and EW signals which often saturate the amplifier. Thus, use of the asymmetric power amplifier allows transmission of the communications signal such that it does not significantly influence radar/EA waveform performance.

In some embodiments, the command and control of both the guard bands as well as the functional area bands of the operation depend on programmable configuration items/modules including one or more of: filters which could be digital or analog, (asymmetric) high power amplifiers (HPAs), a waveform manager which serves as a form of digital switch matrix, a master scheduler, and user inputs and outputs to the system. The total spectral waste due to these guards is indicative of the design figures of merit (such as roll-off) of the filter banks contained in the asymmetric HPA system. However, often "natural" guard bands are produced such that if the communications band and the radar band, for example, are naturally sufficiently far away from each other in frequency domain (such as the 6 MHz shown by item 207 of FIG. 2), no explicit guard band is necessary.

Figure 2:
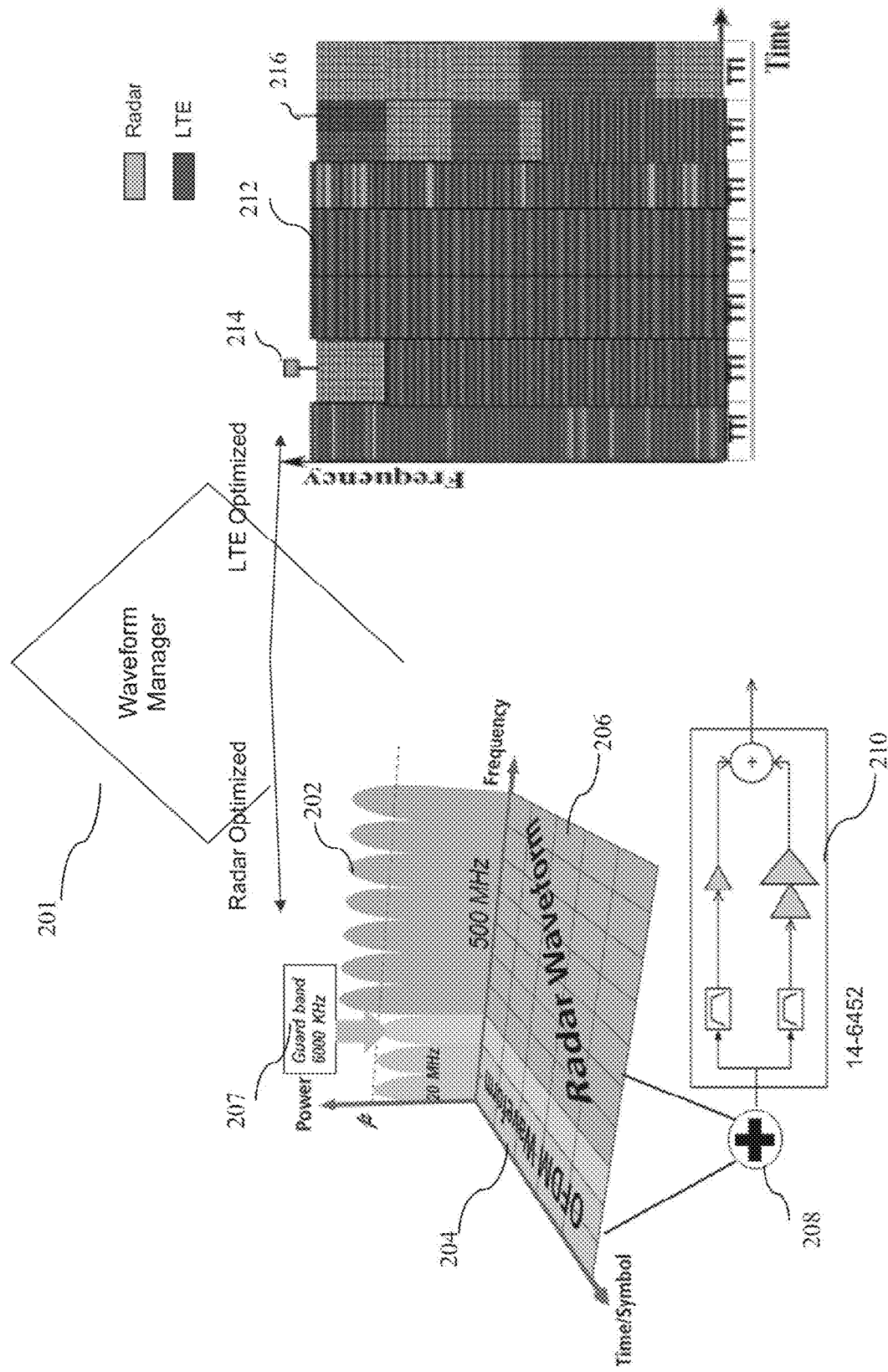
FIG. 2 is an exemplary simplified high level block diagram of a waveform manager, according to some embodiments of the disclosed invention.

FIG. 2 is an exemplary simplified high level block diagram for a waveform manager, according to some embodiments of the disclosed invention. In this example, a radar signal and an LTE protocol signals are used as examples for two different signal types. However, as explained above, the disclosed invention is not limited to radar and LTE signals and other types of signals such as commercial satellite communication signal, or television or radio signals, are well within the scope of the disclosed invention. As shown, a waveform manager 201 optimizes the spectrum of the transmission of a radar signal or a LTE signal such that it uses the minimum amount of spectrum or uses the given spectrum to maximum efficiency to transmit as much information as possible. In some embodiments, the radar signal transmission and the commercial communication signal transmission are optimized depending on system requirement.

Some examples of radar waveform optimization include optimizing the time bandwidth product by using phase-shift-keyed (PSK) waveforms or linear frequency modulated (LFM) waveforms, "chirps." PSK type waveforms are spread spectrum waveforms that take up an instantaneous bandwidth proportional to the chip rate of the PSK signal. In some cases, a Phase shift keyed radar waveform can be made orthogonal to a phase-shift-keyed communications waveform. Other approaches in which the waveforms are optimized, include varying the pulse repetition interval (PRI) of the radar waveform to achieve a certain Doppler resolution or a certain signal integration gain. When a radar is tracking a target and thus is only analyzing certain range gates, other signals can be transmitted while the radar is in receive mode during range gates that the radar is not analyzing.

If the radar signal transmission is optimized, the LTE waveform 204 and the radar waveform 206 are mixed (added) by a mixer (adder) 208 and the combined waveform is fed into an asymmetric power amplifier circuit 210. A more detailed description of an asymmetric power amplifier circuit is described in a U.S. Pat. No. 9,391,684, entitled "Asymmetric Power Amplifier For Digital Beam Forming," the entire content of which is herein expressly incorporated by reference. The output of the asymmetric power amplifier circuit 210 is then fed to the radiating elements of a radar array.

An exemplary plot 202 of the LTE waveform 204 and the radar waveform 206 is shown over power, frequency and time/symbol. As shown, the LTE waveform 204 (denoted as the OFDM Waveform) operates at lower frequencies and lower power levels than the radar waveform 206. Also, a guard band (safe band) 207 of about 6000 KHz separates the LTE waveform 204 and the radar waveform 206. Plot 202 shows a three dimensional (3D) plot of power spectral density (power vs frequency) vs time. Note that the power of the radar signal 202 is higher than the power of the communications (e.g., LTE) signal 204. Also, as time progresses for the radar signal, the time dimension 206, the communications OFDM waveform and the radar waveform remain orthogonal and therefore can be transmitted simultaneously since they never overlap in the frequency dimension.

The plot illustrating 214, 212, and 216 is an exemplary time frequency plot showing sub-frames of signal transmissions that an LTE system typically uses, when the LTE waveform is optimized, meaning that the LTE waveform is always given the preferred frequency and time slot as if the LTE waveform was the only signal being transmitted. The LTE signal transmissions are shown as item 216. The radar signal is time interleaved with the LTE signal by being transmitted during any down time where the LTE signal is not transmitting, as shown by item 214. Some known processes, such as interrupted synthetic aperture radar (SAR), are ideal for this type of radar transmission since this type of waveform can be interrupted and only requires as little as 33% duty cycle to perform with no degradation. Other radar modes could be passively received during these gaps in LTE transmission. The transmitted signals are then reconstructed at the receiver. A detailed description for an interrupted synthetic aperture approach and the reconstruction of the interrupted data can be found in Muriel Pinheiro, "Reconstruction of Coherent Pairs of Synthetic Aperture Radar Data Acquired in Interrupted Mode," IEEE Transactions on Geoscience and Remote Sensing (Volume:53, Issue: 4, pages 1876-1893). Typically, spectral-estimation-based interpolators may be used to reconstruct the data at the receiver end. Although such algorithms show good performance for pointlike targets, their efficiency is decreased for distributed scatterers. The above-mentioned article describes utilizing the common information in one image to reconstruct the other image and vice versa, for a coherent pair of SAR images. For example, where the cooperative nature of the bistatic operation requires the periodic exchange of information between the satellites, a periodic missing data pattern is generated in the raw data to gather information for calibration and synchronization. Subsequently, a reconstruction methods based on spectral estimation are analyzed and the reconstruction is validated using cross-information.

In some embodiments, the signals from all frequency channels are summed, for example, by an adder 208 and passed through a linear, wideband amplifier to the radiating element (or row/column of elements). In some embodiments, when the system operates in linear operating mode, a regular high power amplifier can be used and an asymmetric amplifier may not be required. In general radars operate in saturated high power amplifier mode to achieve the highest amount of output power possible and thus in radar optimized mode, the high power amps are typically saturated. However, communications modes must have linear power amplifiers in most cases so that the communications signal is not distorted. In addition, by leveraging newest ideas from the well-known proposed 5G COTS design, the disclosed invention lowers the side lobes of a traditional 4G/OFDM or IEEE 802.11 protocol signal, for example, by modifying orthogonal frequency-division multiplexing (OFDM) design parameters of the pulse shaping filters and minimum sub-carrier frequency separation, thus, synthesizing more spectrally compact waveforms orthogonal to the original. One example of how autocorrelation side lobes can be shaped is by using a tapering window such as a hamming window, where the tapering window is applied to the waveform through a digital finite impulse response filter (FIR), prior to transmission of the waveform. In some embodiments, the FIR filtering and tapering are performed in the digital domain, for example, after the waveform generation stage (e.g., as shown by waveform generator 540 of FIG. 5). In some embodiments, spatial beamforming may be used to lower spatial side lobes, by using a similar FIR filter before transmission.

In some embodiments, the disclosed invention provides a cognitive waveform that fits in the LTE-A specifications, and yet does not interfere with commercial off-the-shelf (COTS) deployments.

Figure 3:
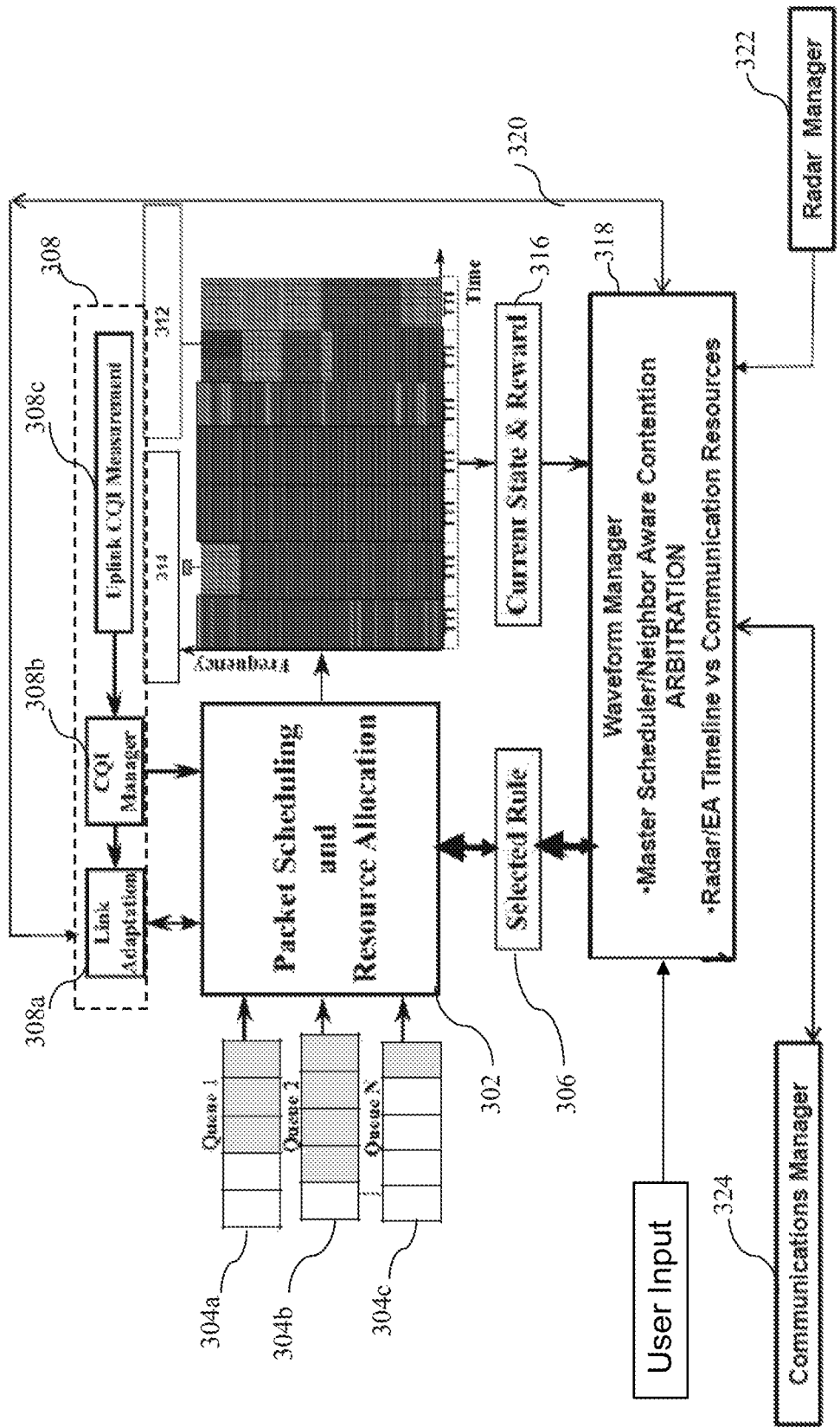
FIG. 3 is a simplified block diagram of a radar communications scheduler, according to some embodiments of the disclosed invention.

FIG. 3 is a simplified block diagram of a radar communications scheduler, according to some embodiments of the disclosed invention. As shown, a communications manager 324 manages resources, manages the overall scenario timeline, and schedules communication modes to transmit and receive waveforms as appropriate based on the system's need. The communications manager 324 sends commands and data to a waveform manager 318 to execute a given communications mode request, such as what waveform to transmit, the duration of the transmission, the repeat rate of the transmission, and other timing and waveform parameters. The communications manager 324 also receives messages resulting from received communications.

A radar manager 322 sends radar mode commands describing the desired waveform to be generated to a waveform manager 318, such as the number of coherent processing intervals or radar frames to run, the pulse repetition interval of the waveforms, the actual waveform to be generated, the frequency and other waveform and timeline parameters to generate the radar mode. The radar manager 322 also receives radar data including detection and track information from the radar mode. This information often appears as symbols on a screen or other user interface to signify where a target has been detected by the radar.

The waveform manager 318 receives different waveform requests such as various communications and radar waveform requests from the individual mode managers, such as a communications manager 324 or the radar manager 322. The requests may be received concurrently. Further, the request may include a request that radar and communications waveforms be transmitted concurrently. If the requests are received concurrently, the radar manager arbitrates and determines first whether the requested waveforms are orthogonal in frequency and whether they can be time interleaved. If not, the radar manager may have to grant only a subset of the requests based on system priority such as LTE prioritized mode or radar prioritized mode, as shown in FIG. 2.

In some embodiments, the waveform manager 318 translates the high level mode requests that come from a mission manager (not shown) into low level hardware commands, such as, down to a sample of what should be transmitted. The waveform manager detects when concurrent requests collide, for instance, when waveforms from different radar modes or communications modes are requested to be transmitted or received simultaneously, and then arbitrates the waveforms. Denied requests are resubmitted or held in a queue and can be granted at a later time, unless the communications manager or radar manager withdraw the requests. In some embodiments, the waveform manager selects rules (for example stored rules from a memory device) 306 and causes a scheduler 302 to schedule transmissions and allocate resources to a plurality of data packet queues (304a-304c) so that the radar and LTE communications become interleaved and do not collide.

Based on the requests to the waveform manager 318, from the communications manager 324 and radar manager 322, commands are sent to a packet scheduler 302 indicating how to prioritize and send data at the packet level. Packets of data are then sent to queues 1 to N (304a, 304b ... 304c) to be scheduled on a packet level by various concurrent communications or radar modes. In some embodiments, each communications, radar, EW or other mode may have its own dedicated queue. For example, communication waveforms may be queued in queue 304a, radar waveforms may be queued in queue 304b, EW waveforms may be queued in queue 304c, and so on. In some embodiments, communications manager 324, radar manager 322 and waveform manager 318 include software and/or firmware instructions executed on a special purpose processor (such as an application specific integrated circuit (ASIC)) or a general purposed processor/controller with associated known circuitry, such as memory and I/O circuits.

In some embodiments, a quality of service module/circuit 308 provides service quality metrics to the packet scheduler 302 to scheduler the transmission of the communications packets with high quality of service. For example, for communications signals, an uplink channel quality indicator (CQI) measurement is taken by circuit 308c. This CQI measurement is sent to a CQI manager 308b to provide metrics about the channel where the waveforms are being or going to be transmitted in. The metrics may include noise and bandwidth data. The channel metrics is used to adapt the parameters of the transmitted comms signals, such as amplitude and power of the signal calculated by a link adapter 308a. This data is then sent to and utilized by the packet scheduler 302 to transmit the communications packets with high quality of service. The LTE signals 312 are then scheduled for transmission over the channel. The radar packets 314 are also scheduled according to the available resources (for the LTE optimized mode). The state of the system, such as how many communications and radar packets were transmitted, and whether the desired parameters and constraints that were requested by radar waveform and communications waveform, such as the pulse repetition interval (PRI) and transmission time, were satisfied, are all computed in a state and reward circuit/module 316 and sent to the waveform manager 318. In some embodiments, the waveform manager 318 (which may include a processor, memory and associated circuitry) handles arbitration between waveforms such as two different modes requesting the same spectrum at the same time. In this case, the waveform manager 318 decides to which mode grant resources if the waveform requests are not compatible.

Figure 4:
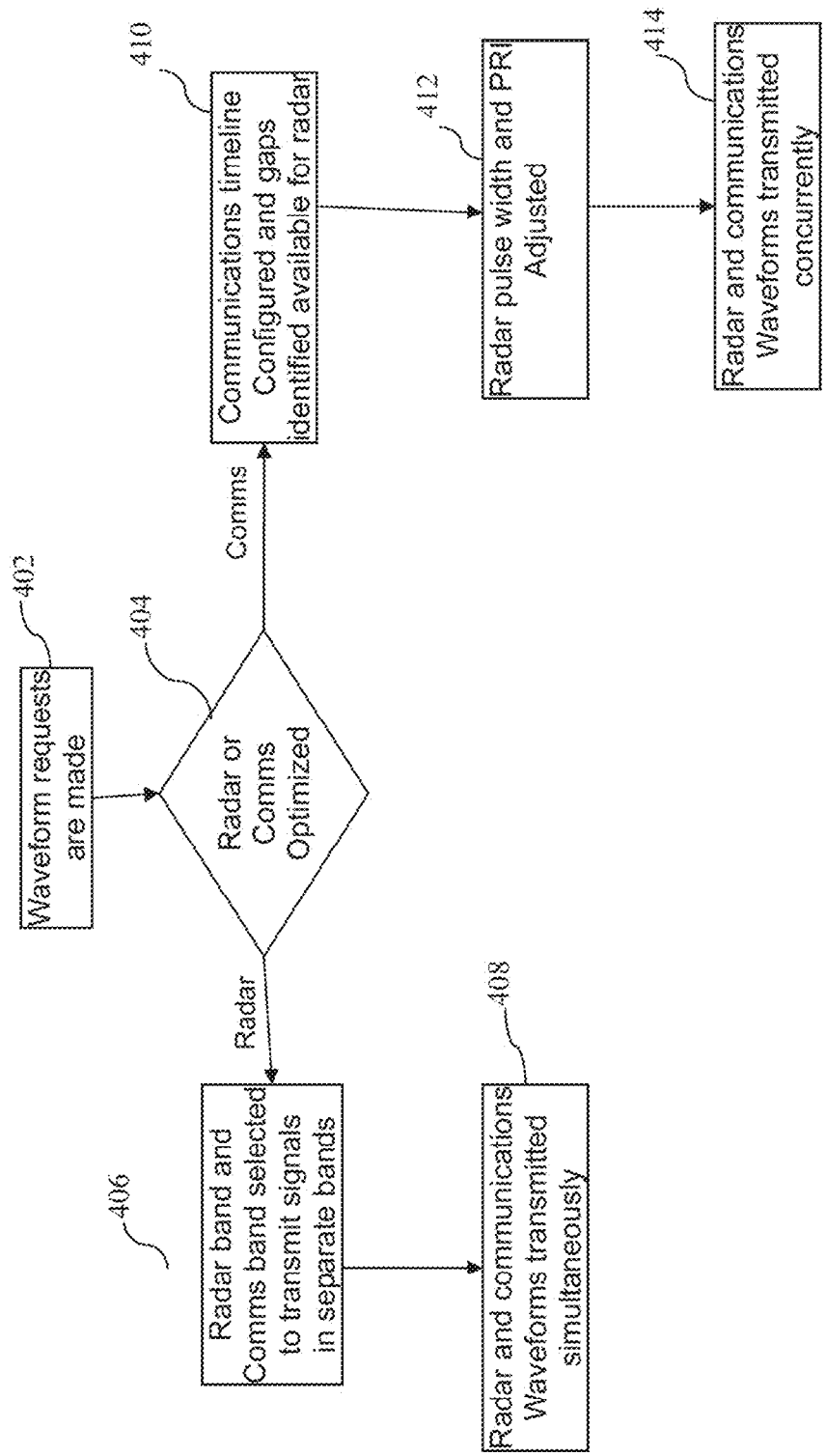
FIG. 4 is a simplified process flow diagram of a radar communications scheduler, according to some embodiments of the disclosed invention.

FIG. 4 is a simplified process flow diagram of a radar communications scheduler, according to some embodiments of the disclosed invention. As shown in block 402, waveform requests are received and proceed. In some embodiments, waveform requests are received from the individual modes operating within the system, such as, a communications manager or a radar manager. An example of a radar mode request may include a target tracking mode that requires 1000 pulses that are linearly frequency modulated over 600 MHz with a pulse width of 100 us each. In block 404, it is decided whether the radar waveform or the non-radar (e.g., comms) waveform is to be optimized. The decision in block 404 is typically driven by mission parameters and may be set by the user (e.g., a pilot in case of an aircraft), by mission planners prior to the mission or automatically by the system as part of a command or a waveform request.

If it is determined (based on the waveform request) that the radar waveform is to be optimized, the radar band and comms band are selected and the radar system is configured to transmit the radar waveform and the non-radar (e.g., comms) waveform in separate bands, in block 406. The radar waveform and the non-radar (e.g., comms) waveform are then transmitted simultaneously in block 408. The waveforms 206 and 208 shown in FIG. 2 are representative examples of the outputs of blocks 406 and 408.

If it is determined (based on the waveform request) that the comms waveform is to be optimized, the communication timeline for transmission is configured and the gaps in time-frequency map that is available for the radar waveform is determined, in block 410. For example, assuming 1 millisecond of available time gap in between LTE transmissions is available, the radar would fill these time gaps by attempting to passively receive signals for signal intelligence and passive radar applications. In the examples where a few milliseconds were available as a time gap such that an entire coherent processing interval (CPI) of radar pulses could be transmitted and received, the radar would transmit and receive all of the necessary pulses in the time gap between LTE transmissions.

Once gaps (in time-frequency map) available for radar are identified in block 410, then the PRI and pulse width of the radar mode is adjusted in block 412 to fit within the available gap. For example, to extend the range of the radar, longer PRI's are needed. In order to fit within the available time gap, the range of the radar may need to be adjusted. For instance, the range of the radar can be reduced in block 412 to fit within the available time slot. Conversely, the number of pulses and pulse width partially determines the signal processing gain of the radar, and fewer pulses or shorter pulses can be transmitted to fit the available time gap. The radar waveform and the non-radar (e.g., comms) waveform are then transmitted concurrently in block 414. at the frame level. In this context, concurrently at the frame level means that the radar pulse pattern is transmitted concurrently as the comms signal pattern, even though at the pulse level the radar pulses are time interleaved with the communications signals.

For example, when an airborne platform wishes to communicate through an LTE advanced protocol with a friendly LTE-A node or LTE-A base station and also wishes to execute an air-to-ground radar mode, such as a ground moving target indicator (GMTI) mode, radar and communication mode requests are made, in some circumstances, simultaneously. A waveform manager (described above)

executes a waveform management process to arbitrate and adjusts the radar and LTE waveform parameters and determines when to transmit the LTE-A packets and when to transmit the radar pulses. For example, suppose a user or the system sets the priority of the system to LTE prioritized mode. As requests for waveforms come in, all requests are granted until a conflict is detected where two or more requests compete to transmit non-synergistic waveforms (which cannot be combined into a single transmission) that require the same frequency and time slot.

In some embodiments, this conflict is determined by a look up table which is precomputed and stored in a memory. For example, since the pulse pattern of a radar is known ahead of time, and if the communications transmission pattern is also known ahead of time for a given set of parameters, whether the two versions of the modes (with these given parameters) are in conflict or not is also know ahead of time. Then, when these parameters are requested by the modes, the lookup table is used to lookup for these combination of parameters, for example, a binary 1 or 0 may represent whether this parameter set presents a conflict or not.

The waveform manager then determines which requests can be fully granted, granted in a modified way (such as shortening the PRI and pulse width of the radar), or must be denied. In some embodiments, the individual mode managers include additional parameters in the waveform request, such as the range of PRI and pulse widths that are tolerable to the waveform manager, to help the waveform manager make a decision to modify or deny the request. Once requests are granted (as is or modified) or denied, the individual mode managers are notified and the waveform and mode data is sent on to the packet scheduler to schedule the low level packets. The individual mode managers then send their waveform data to the packet scheduler queues.

In the receive mode, the radar system receives all signals within the bandwidth of the receiver and thus both the radar signal and communications signal can be received concurrently in the same receive window.

Figure 5:
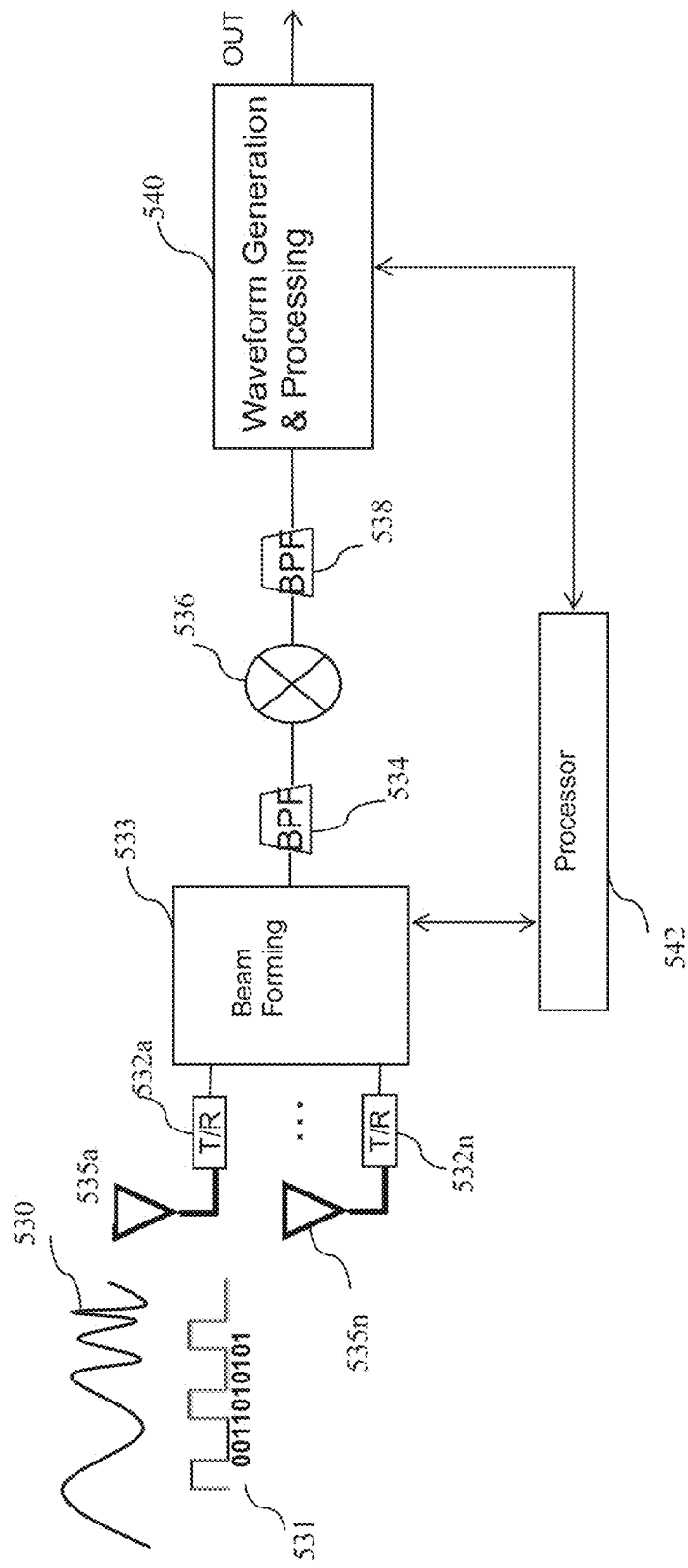
FIG. 5 is a simplified block diagram of a multi-element antenna array, according to some embodiments of the disclosed invention.

FIG. 5 is a simplified block diagram of a multi-element antenna array, according to some embodiments of the disclosed invention. The exemplary antenna array may be an Electronically Scanned Array (ESA) antenna utilized by a radar system. As shown, a wide band analog signal 530, for example a radar mode, is received by one or more of a plurality of antenna elements 532a-532n. Similarly, a communication waveform 531, for example, a LTE waveform, is received by one or more of the plurality of antenna elements 532a-532n. Both signals 530 and 531 are input to a beam forming circuit 533. The beam forming circuit 533 may be controlled by a processor and associated circuitry 542 (e.g., memory, input/output, etc.). The beam forming circuit 533 performs various signal processing and waveform generations tasks, controlled by the processor 542. In some embodiments, the beam forming circuit 533 drives a Digital-to-Analog Convertor (DACs) to convert the digital communication waveform 531 to an analog signal and then power amplify the two signals, which are then filtered by a bandpass filter 532.

In some embodiments, an asymmetric power amplifier splits the combined input signals back into two or more frequency bands, using, for example, a (digitally) programmable analog finite impulse response (FIR) filter (for example, as depicted by item 210 in FIG. 2). In some embodiments, the power amplifier fits within the T/R modules 532a to 532n. The waveforms are combined, in the radar optimized mode, by a waveform generator 540. For transmission mode, the combined waveform is sent out from the waveform generator 540 to a filtering circuit 538 and through the rest of the chain to be transmitted out of the antennas 535a-535n following the T/R modules 532a-532n.

For receiving mode, the signals are sent to a processor 542 for further processing. Since the subcarriers may change broadly in frequency and content, the filters, such as filters 538, 534, and any filter in the T/R module (e.g., 532a-532n) need to be tuned/programmed, as the subcarriers change. A mixer 536 provides frequency up conversion from baseband or intermediate frequency (IF) to RF frequency for transmit and frequency down conversion from an RF frequency to an IF or baseband for receive. In some embodiments, the T/R modules 532a-532n may contain an analog FIR filter, such as depicted by item 210 in FIG. 2. The analog FIR filter is capable of filtering its input signal such that a single subcarrier is input into the power amplifier. This avoids the inter modulation products that occur when multiple subcarriers are input to the power amplifier, particularly if the power amplifier is in saturation mode. FIG. 4 shows an exemplary process that is executed by processor 542 and waveform generator 540, to determine what signal is eventually transmitted out to the rest of the components in transmit chain.

The asymmetric power amplifier individually amplifies frequency bands with different gain levels and combines with a power combiner, as described in more detail in U.S. application Ser. No. 14/851,532. The combined signal is then fed into a transmitter, for example, a transmitter of an antenna array. This allows a multi-carrier signal to be filtered such that each subcarrier is amplified individually creating much improved power efficiency.

The output of the waveform generation & processing circuit 540 is then fed to, for example, an antenna array and then directed to a respective radar circulator of the antennal array, for example, a multi-polarized circulator, which can then be transmitted through a single radar aperture. This way, the antenna array, or any other type of transmitter, is capable of simultaneously transmitting two or more combined signals of different types out of the same antenna element with different power amplification levels for each signal to efficiently amplify a multi-carrier signal and effectively allocate spectrum for the two or more combined signals of different types.

In some embodiments, when the radar and comms packets are frequency multiplexed, a single multi-carrier waveform containing both radar and comms information at different frequency bands is transmitted through the above described architecture/circuit. In the case, where the radar comms packets are time multiplexed and exist at the same frequency, a comms packet is transmitted through the system and then a radar pulse is transmitted through the system, or vice versa, as dictated by the waveform manager timeline. Packets and radar returns are also scheduled in this similar way and the process is repeated for reception of the waveforms for the communications and the radar modes.

In the receiving mode, the radar system receiving bandwidth is tuned to the bandwidth of the received signals whether they are communications signals, radar signals, or both, if the radar system has a sufficiently wide bandwidth to cover all of the received signals. In both of the radar case and the communications case, the received waveforms are typically input through a digital down converter and/or re-sampler to resample the signals or frequency convert them from IF to baseband, if the signals are not already at baseband. In the radar case, matched filtering may be used similar to the communications case as matched filtering is often used, but a de-spreader and/or a demodulator and decoder are also typically applied to the received signal.

The modular and open co-design architecture of the disclosed invention provides multiple simultaneous RF functions (e.g., radar, communication, EW and/or even IFF) into a single aperture without necessitating any time division multiple access (TDMA), commutation or segmentation into sub-aperture operation. The modular aspects allows for the independent optimizations of the respective functional waveforms without impacting the functionality of the different RF functions. This way, the real time computational burden for each pulse is minimized.

Moreover, the unique scheduling according to the disclosed invention controls the arbitration of the different RF timelines as well as the asymmetric HPA sub-system and switch matrix. Thus the classic competing issues of the desire to place radar waveform in compression or EW and concurrent with a high throughput orthogonal frequency-division multiple access (OFDMA) does not amplify PAPR for the communications portion of the aggregate waveform.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope of the invention as defined by the appended claims.

What is claimed is:

1. A method for concurrent transmission of different signal types by a radar system, the method comprising:
   receiving a waveform request for transmitting a first signal with a first frequency and a first power level and a second signal with a second frequency and a second power level, wherein the first frequency is higher than the second frequency and the first power level is higher than the second power level;
   determining whether the first signal or the second signal is prioritized for transmission;
   when the first signal is prioritized for transmission:
      combining the first signal and the second signal,
      splitting the combined first and second signals back into two or more frequency bands, and
      simultaneously transmitting the first and the second signals in said two or more frequency bands in separate bands; and
   when the second signal is prioritized for transmission:
      determining a time gap between transmission of the second signal,
      adjusting pulse repetition interval (PRI) or pulse width of the first signal to fit in the time gap,
      transmitting the second signal, and
      transmitting the first signal in the time gap between the transmission of the second signal.

2. The method of claim 1, wherein the first signal is a radar signal and the second signal is a communication signal other than the radar signal.

3. The method of claim 1, wherein the first signal is a radio frequency (RF) signal and the second signal is a Long-Term Evolution (LTE) protocol or an electronic warfare (EW) signal.

4. The method of claim 1, wherein determining whether the first signal or the second signal is prioritized for transmission is responsive to receiving a user input.

5. The method of claim 1, wherein determining whether the first signal or the second signal is prioritized for transmission is automatically performed by the radar system based on the received waveform request.

6. The method of claim 1, further comprising detecting a conflict when the first signal and the second signal compete for a transmissions that require the same frequency and time gap.

7. The method of claim 6, wherein the conflict is detected using a look up table stored in a memory.

8. The method of claim 6, further comprising reconstructing the transmitted signals.

9. The method of claim 1, further comprising determining whether the received waveform request to be fully granted, granted in an adjusted way, or denied.

10. The method of claim 1, wherein the received waveform request includes a range of PRI and pulse widths for determining whether to modify or deny the received waveform request.

11. A radar system for concurrent transmission of different signal types comprising:
   a waveform manager for receiving a waveform request for transmitting a first signal with a first frequency and a first power level and a second signal with a second frequency and a second power level, wherein the first frequency is higher than the second frequency and the first power level is higher than the second power level;
   a radar manager for determining whether the first signal or the second signal is prioritized for transmission;
   a transmitter for transmitting the first and the second signal simultaneously in separate bands, when the first signal is prioritized for transmission, wherein when the second signal is prioritized for transmission,
      a scheduler determines a time gap between transmission of the second signal, and the waveform manager adjusts pulse repetition interval (PRI) or pulse width of the first signal to fit in the time gap, and the transmitter transmits the second signal and transmits the first signal in the time gap between the transmission of the second signal;
   a mixer for combining the first signal and the second signal; and
   an asymmetric power amplifier for splitting the combined first and second signals back into two or more frequency bands and independently amplifying the first signal and the second signal before transmission.

12. The radar system of claim 11, wherein the first signal is a radar signal and the second signal is a communication signal other than the radar signal.

13. The radar system of claim 11, wherein the first signal is a radio frequency (RF) signal and the second signal is a Long-Term Evolution (LTE) protocol or an electronic warfare (EW) signal.

14. The radar system of claim 11, wherein the waveform manager detects a conflict when the first signal and the second signal compete for a transmissions that require the same frequency and time gap.

15. The radar system of claim 14, wherein the waveform manager detects the conflict using a look up table stored in a memory.

16. The radar system of claim 11, wherein the waveform manager determines whether the received waveform request to be fully granted, granted in an adjusted way, or denied.

17. The radar system of claim 11, wherein the received waveform request includes a range of PRI and pulse widths for determining whether to modify or deny the received waveform request.

18. The radar system of claim 11, wherein the waveform manager determines whether the received waveform request to be fully granted, granted in an adjusted way, or denied.

* * * * *